United States Patent
Fehnel

[19]

[11] Patent Number: 5,963,869
[45] Date of Patent: Oct. 5, 1999

[54] METHOD AND APPARATUS FOR MANAGEMENT OF ANALOG AND DIGITAL CONTROL CHANNELS

[75] Inventor: Michael David Fehnel, Fuquay-Varina, N.C.

[73] Assignee: Ericsson Inc., Research Triangle Park, N.C.

[21] Appl. No.: 08/615,105

[22] Filed: Mar. 14, 1996

[51] Int. Cl.[6] .................................................. H04Q 7/00
[52] U.S. Cl. ............................................................. 455/511
[58] Field of Search .................................. 455/433, 434, 455/435, 450, 455, 533, 511, 436, 437; 370/462

[56] References Cited

U.S. PATENT DOCUMENTS

| | | |
|---|---|---|
| 3,913,017 | 10/1975 | Imaseki . |
| 4,633,509 | 12/1986 | Scheinert . |
| 4,716,407 | 12/1987 | Borras et al. . |
| 4,903,320 | 2/1990 | Hanawa . |
| 5,119,397 | 6/1992 | Dahlin et al. ............................. 375/5 |
| 5,193,109 | 3/1993 | Chien-Yeh-Lee . |
| 5,239,678 | 8/1993 | Grube et al. . |
| 5,307,400 | 4/1994 | Sawyer et al. . |
| 5,383,221 | 1/1995 | Akita et al. . |
| 5,404,355 | 4/1995 | Raith . |
| 5,420,911 | 5/1995 | Dahlin et al. ............................. 379/59 |
| 5,475,862 | 12/1995 | Sawyer . |
| 5,564,077 | 10/1996 | Obayashi et al. . |
| 5,570,467 | 10/1996 | Sawyer . |
| 5,574,728 | 11/1996 | Mamaghani et al. . |
| 5,603,081 | 2/1997 | Raith et al. . |
| 5,659,598 | 8/1997 | Byrne et al. . |

FOREIGN PATENT DOCUMENTS

WO 95/12936  5/1995  WIPO .

*Primary Examiner*—William Cumming
*Attorney, Agent, or Firm*—Robert A. Samra

[57] ABSTRACT

A system and method for directing mobile stations from an analog control channel (ACCH) to a digital control channel (DCCH). According to the present invention, a dual-mode mobile station transmits over the ACCH a system access message (e.g., registration access message) to the system. The system recognizes the access to be from a dual-mode mobile station and selects a DCCH based on the subscriber profile and current location of the mobile station. The system then sends over the ACCH a mobile station control message (e.g., registration confirmation message) including data identifying the selected DCCH to the mobile station.

9 Claims, 3 Drawing Sheets

METHOD AND APPARATUS FOR MANAGEMENT OF ANALOG AND DIGITAL CONTROL CHANNELS

BACKGROUND OF THE INVENTION

1. Field of the Invention

The present invention relates to wireless communication systems and, more particularly, to cellular communications systems which use an analog control channel (ACCH) and a digital control channel (DCCH) for providing service to a plurality of mobile stations that are capable of operating on the ACCH and/or the DCCH.

2. Related Prior Art Systems

Cellular mobile telephony is one of the fastest growing segments in the worldwide telecommunications market. In the United States, cellular radio systems have been operating since the early 1980s and their subscriber base has steadily increased during this period. Between 1984 and 1992, for example, the number of mobile telephone subscribers in the United States grew from around 25,000 to over 10 million. It is estimated that the number of subscribers will rise to nearly 22 million by year end 1995 and to 90 million by the year 2000.

Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is billed based on the amount of "airtime" he or she spends talking on the cellular telephone each month. Many of the service features available to landline telephone users (e.g., call waiting, call forwarding, three-way calling, etc.) are also generally available to mobile subscribers.

In the United States, cellular licenses have been awarded by the Federal Communications Commission (FCC) pursuant to a licensing scheme which divided the country into geographic service markets defined according to the 1980 Census. The major metropolitan markets are called metropolitan statistical areas (MSAs) while the smaller rural markets are called rural statistical areas (RSAs). Only two cellular licenses are awarded for each market. The two cellular systems in each market are commonly referred to as the "A" system and "B" system, respectively. Each of the two systems is allocated a different frequency block in the 800 MHz band (called the A-band and B-band, respectively). Mobile subscribers have the freedom to subscribe to service from either the A-system or the B-system operator (or both). The local system from which service is subscribed is called the "home" system. When travelling ("roaming") outside the home system, a mobile subscriber may be able to obtain service in a distant system if there is a roaming agreement between the operators of the home and "visited" systems.

In a typical cellular radio system as shown in FIG. 1, a geographical area (e.g., a metropolitan area) is divided into several smaller, contiguous radio coverage areas (called "cells") such as cells C1–C10. The cells C1–C10 are served by a corresponding group of fixed radio stations (called "base stations") B1–B10, each of which operates on a subset of the radio frequency (RF) channels assigned to the system. For illustration purposes, the base stations B1–B10 are shown in FIG. 1 to be located at the center of the cells C1–C10, respectively, and are shown to be equipped with onmi-directional antennas transmitting equally in all directions. However, the base stations B1–B10 may also be located near the periphery or otherwise away from the centers of the cells C1–C10, and may illuminate the cells C1–C10 with radio signals directionally (e.g., a base station may be equipped with three directional antennas each covering a 120 degrees sector).

The RF channels allocated to any given cell (or sector) may be reallocated to a distant cell in accordance with a frequency reuse pattern as is well known in the art. In each cell (or sector), at least one RF channel (called the "control" or "paging/access" channel) is used to carry control or supervisory messages, and the other RF channels (called the "voice" or "speech" channels) are used to carry voice conversations. The cellular telephone users (mobile subscribers) in the cells C1–C10 are provided with portable (hand-held), transportable (hand-carried) or mobile (car-mounted) telephone units (mobile stations) such as mobile stations M1–M9, each of which communicates with a nearby base station. The base stations B1–B10 are connected to and controlled by a mobile services switching center (MSC) 20. The MSC 20, in turn, is connected to a central office (not shown in FIG. 1) in the landline (wireline) public switched telephone network (PSTN) or to a similar facility such as an integrated system digital network (ISDN). The MSC switches calls between wireline and mobile subscribers, controls signalling to the mobile stations, compiles billing statistics, stores subscriber service profiles, and provides for the operation, maintenance and testing of the system.

Access to a cellular system by any of the mobile stations M1–M9 is controlled on the basis of a mobile identification number (MIN) and an electronic serial number (ESN) which are stored in the mobile station. The MIN is a digital representation of the 10-digit directory telephone number assigned to each mobile subscriber by the home system operator. The electronic serial number (ESN) is assigned by the manufacturer and permanently stored in the mobile station. The MIN/ESN pair is sent from the mobile station when originating a call and its validity is checked by the MSC. If the MIN/ESN pair is determined to be invalid (e.g., if the ESN has been blacklisted because the mobile station was reported to be stolen), the system may deny access to the mobile station. The MIN is also sent from the system to the mobile station when alerting the mobile station of an incoming call.

When turned on (powered up), each of the mobile stations M1–M9 enters the idle state (standby mode) and tunes to and continuously monitors the strongest control channel (generally, the control channel of the cell in which the mobile station is located at that moment). When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel. In the United States, there are 21 "dedicated" control channels (predefined frequencies) in each cellular system which means that the mobile station has to scan a maximum number of 21 RF channels. When a control channel with good reception quality is found, the mobile station remains tuned to this channel until the quality deteriorates again. In this manner, the mobile station remains "in touch" with the system and may receive or initiate a telephone call through one of the base stations B1–B10 which is connected to the MSC 20.

To detect incoming calls, the mobile station continuously monitors the current control channel to determine whether a page message addressed to it (i.e., containing its MIN) has been received. A page message will be sent to the mobile station, for example, when an ordinary (landline) subscriber calls the mobile subscriber. The call is directed from the PSTN to the MSC 20 where the dialed number is analyzed. If the dialed number is validated, the MSC 20 requests some or all of the base stations B1–B10 to page the called mobile station throughout their corresponding cells C1–C10. Each of the base stations B1–B10 which receive the request from the MSC 20 will then transmit over the control channel of the corresponding cell a page message containing the MIN of the called mobile station. Each of the idle mobile stations M1–M9 which is present in that cell will compare the MIN in the page message received over the control channel with the MIN stored in the mobile station. The called mobile station with the matching MIN will automatically transmit a page response over the control channel to the base station which then forwards the page response to the MSC 20. Upon receiving the page response, the MSC 20 selects an available voice channel in the cell from which the page response was received (the MSC maintains an idle channel list for this purpose), and requests the base station in that cell to order the mobile station via the control channel to tune to the selected voice channel. A through-connection is established once the mobile station has tuned to the selected voice channel.

When, on the other hand, a mobile subscriber initiates a call (e.g., by dialing the telephone number of an ordinary subscriber and pressing the "send" button on the telephone handset in the mobile station), the dialed number and MIN/ESN pair for the mobile station are sent over the control channel to the base station and forwarded to the MSC 20 which validates the mobile station, assigns a voice channel and establishes a through-connection for the conversation as described before.

If the mobile station moves between cells while in the conversation state, the MSC 20 will perform a "handoff" of the call from the old base station to the new base station. The MSC 20 selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MSC 20 via the new cell. The old voice channel in the old cell is marked idle in the MSC 20 and may be used for another conversation.

The cellular telephone system of FIG. 1 had its origin in the provision of car telephone service. In the last few years, however, there has been an increasing shift towards the use of lightweight pocket telephones in homes, offices, public meeting places, and in virtually any other place the user can obtain service. The next step in this evolution is the emerging concept of "personal communication services" (PCS) or what has sometimes been referred to as services at "walking speeds." The goal is that not only telephone calls but also facsimile, computer data, paging messages and even video signals can be transmitted and received by a user moving around, for example, inside a building, a factory, a warehouse, a shopping mall, a convention center, an airport, or an open area.

PCS systems operate on lower power and use smaller cellular structures than conventional wide area (vehicular) cellular systems so as to provide the high-quality, high-capacity radio coverage needed for private business and other applications. By reducing the transmit power of the base station, the size of the cell (or cell radius) and, with it, the frequency reuse distance are reduced thereby resulting in more channels per geographic area (i.e., increased capacity). Additional benefits of a smaller cell include a longer "talk time" for the user since the mobile station will use substantially lower transmit power than in a larger cell and consequently its battery will not need to be recharged as often.

The cellular industry has grown accustomed to using the terms "macrocell," "microcell," and "picocell" to distinguish the relative size of the cells required for a particular application (indoor or outdoor). The term "macrocell" generally refers to a cell which is comparable in size to cells in a conventional cellular telephone system (e.g., a radius of 1 Km or more). A macrocell usually serves rapidly moving users and covers low to medium usage areas. The terms "microcell" and "picocell," on the other hand, refer to the progressively smaller cells which are used, for example, in a PCS system. A microcell serves the slowly moving users and may cover a public indoor or outdoor area (e.g., a convention center or a busy downtown street). A picocell may cover an office corridor or a floor of a high rise building. Microcells and picocells can also cover high-density pedestrian areas or busy thorough-fares (streets or highways) in a conventional cellular system.

It is now clear that the next generation cellular systems will implement a hierarchial cell structure of macrocells, microcells and picocells which may include one or more private systems (e.g., a wireless PBX system for an office building). From a system (MSC) perspective, the base stations in the microcells and picocells can be viewed as extensions of the base stations in adjoining or overlapping macrocells. In this case, the microcell and picocell base stations may be connected to the macrocell base station via digital transmission lines, for example. Alternatively, the microcells and picocells may be treated just like macrocells and be connected directly to the MSC. From a radio coverage perspective, the macrocells, microcells and picocells may be distinct from each other or, alternatively, overlaid one on top of the other to handle different traffic patterns or radio environments. For example, handoff between microcells may sometimes be difficult to perform around street corners, particularly where the users are moving so rapidly that the signal strength variations are in excess of 20 dB per second. In this situation, it may be possible to use an "umbrella" macrocell for the rapidly moving users and to use microcells for the slowly moving users. By managing different types of users differently in this way, handoff between microcells may be avoided for the rapidly moving users which are subject to the severe street corner effects.

The original cellular radio systems, as described above, used analog transmission methods, specifically frequency modulation (FM), and duplex RF channels in accordance with the Advanced Mobile Phone Service (AMPS) standard. According to the AMPS standard, each control or voice channel between the base station and the mobile station consists of a pair of separate frequencies, a forward (downlink) frequency for transmission by the base station (reception by the mobile station) and a reverse (uplink) frequency for transmission by the mobile station (reception by the base station). The AMPS system, therefore, is a single-channel-per-carrier (SCPC) system allowing for only one voice circuit (telephone conversation) per RF channel. Different users are provided access to the same set of RF channels with each user being assigned a different RF channel (pair of frequencies) in a technique known as frequency division multiple access (FDMA). This AMPS (analog) architecture was the basis for the industry standard sponsored by the Electronics Industries Association (EIA) and the Telecommunication Industry Association (TIA), and known as EIA/TIA-553.

In the late 1980s, however, the cellular industry in the United States began migrating from analog to digital technology, motivated in large part by the need to address the growth in the subscriber population and the increasing demands on system capacity. It was recognized early that the capacity improvements sought for the next generation cellular systems could be achieved by the introduction of microcells or picocells to the specific areas where increased capacity is needed (i.e., cell splitting those areas) or by the use of more advanced digital radio technology which could be applied to the existing macrocells, or by a combination of both approaches. Thus, for example, analog microcells may be implemented to cover "dead spots" (areas where topography or zoning or other restrictions prevent penetration of radio signals) or "hot spots" (areas with heavy localized traffic). In this instance, coverage or capacity may be improved for the existing subscriber base which is using analog mobile stations. However, the actual capacity gain is limited by the use of the analog AMPS technology. The effectiveness of the microcellular (cell splitting) concept in increasing capacity can be maximized only by the use of digital technology (which requires new digital-capable mobile stations).

In the effort to go digital, the EIA/TIA has developed a series of digital standards which rely on voice encoding (digitization and compression) and time division multiple access (TDMA) techniques to multiply the number of voice circuits (conversations) per RF channel (i.e, to increase capacity). The original standard in this series was known as the IS-54 standard. To ease the transition from analog to digital and to allow the continued use of existing analog mobile stations, the IS-54 standard supported the original AMPS analog voice and control channels and additionally provided for the use of digital traffic channels for speech (but not digital control channels) within the existing AMPS network. This "dual-mode" (analog-digital) standard, therefore, became known as the digital AMPS (D-AMPS) standard. More recently, the industry has developed a new specification for D-AMPS which includes a digital control channel suitable for supporting public or private microcell operation, extended mobile station battery life and end-user features characteristic of PCS. This new specification is known as IS-136 and it builds on the IS-54B standard (the current revision of IS-54). All of the foregoing standards are hereby incorporated herein by reference (copies of these standards may be obtained from the Electronics Industries Association; 2001 Pennsylvania Avenue, N.W.; Washington, D.C. 20006).

According to IS-54B and as shown in FIG. 2, each RF channel is time division multiplexed (TDM) into a series of repeating time slots which are grouped into frames carrying from three to six digital speech channels (three to six telephone conversations) depending on the source rate of the speech coder used for each digital speech channel. Each frame on the RF channel comprises six equally sized time slots (1–6) and is 40 ms long (i.e, there are 25 frames per second). The speech coder for each digital traffic channel (DTCH) can operate at either full-rate or half-rate. A full-rate DTCH uses two equally spaced slots of the frame (i.e., slots 1 and 4, or slots 2 and 5, or slots 3 and 6). When operating at full-rate, the RF channel may be assigned to three users (A–C). Thus, for example, user A is assigned to slots 1 and 4, user B is assigned to slots 2 and 5, and user C is assigned to slots 3 and 6 of the frame as shown in FIG. 2. Each half-rate DTCH uses only one time slot of the frame. At half-rate, the RF channel may be assigned to six users (A–F) with each user being assigned to one of the six slots of the frame as also shown in FIG. 2. Thus, it can be seen that the DTCH as specified in the IS-54B standard allows for an increase in capacity of from three to six times that of the analog RF channel. At call set-up or handoff, a dual-mode mobile station will be assigned preferably to a digital traffic channel (DTCH) and, if none is available, it can be assigned to an analog voice channel (AVC). An analog-only mobile station, however, can only be assigned to an AVC.

The IS-136 standard specifies a digital control channel (DCCH) which is defined similarly to the digital traffic channel (DTCH) specified in IS-54B (i.e., on the same set of RF channels and with the same TDMA frame format and slot size). Referring back to FIG. 2, a half-rate DCCH would occupy one slot while a full-rate DCCH would occupy two slots out of the six slots in each 40 ms frame. The DCCH slots may then be mapped into different logical channels which are organized into a series of superframes. FIG. 3 shows the superframe structure of a full-rate DCCH according to IS-136 (in this example, the DCCH is defined over channel "A" in the TDMA frame). A superframe is defined in IS-136 as the collection of 32 consecutive time slots (640 ms) for a full-rate DCCH (16 slots for a half-rate DCCH). The logical channels specified in IS-136 include a broadcast control channel (BCCH) for carrying system-related information which is broadcast to all mobile stations, and a short message service, paging and access response channel (SPACH) for carrying information which is sent to specific mobile stations.

As shown in FIG. 3, the BCCH is divided into logical subchannels each of which is assigned an integer number of DCCH slots. The BCCH subchannels include a fast BCCH (F-BCCH), an extended BCCH (E-BCCH) and a point-to-multipoint short message service BCCH (S-BCCH). The F-BCCH is used to broadcast DCCH structure parameters and other parameters required for accessing the system (the first slot in a superframe is always assigned to the F-BCCH). The E-BCCH is used to broadcast information that is not as time-critical (for the operation of the mobile stations) as the information in the F-BCCH. The S-BCCH is used for the broadcast short message service (SMS) which can deliver alphanumeric messages of common interest to all mobile stations (e.g., traffic reports). The SPACH is also divided into logical subchannels each of which is assigned a given number of time slots on a fully dynamic basis (and, thus, these subchannels are not explicitly shown in FIG. 3). The SPACH subchannels include a point-to-point short message service channel (SMSCH), a paging channel (PCH) and an access response channel (ARCH). The SMSCH is used for carrying alphanumeric messages of interest to a specific mobile station (e.g., stock quotations). The PCH is used for carrying paging messages to different mobile stations (each mobile station is assigned to a predefined "paging frame class" which defines the periodicity with which it reads the PCH). The ARCH is used for responding to access requests from one of the mobile station (e.g., by delivering a channel assignment message to this mobile station).

An idle mobile station operating on the DCCH of FIG. 3 need only be "awake" (monitoring) during certain time slots (e.g., the F-BCCH or its assigned PCH slot) in each DCCH superframe and can enter "sleep mode" at all other times. While in sleep mode, the mobile station turns off most internal circuitry and saves battery power. Sleep mode operation reduces battery drain in the mobile station during idle mode and increases "talk time" for the user (i.e., the period between battery recharging). Furthermore, the user of this mobile station may be able to access a host of value-added data services through the SMS facilities provided in IS-136. For example, the user could receive frequent traffic updates over the S-BCCH. The user could also retrieve, for example, desired stock quotations over the SMSCH. These examples and a variety of other ISDN-type services are facilitated by the use of the DCCH specified in IS-136. In addition, IS-136 provides a cell selection procedure for hierarchial cell structures which optimizes capacity by biasing the cell selection criteria in favor of microcell selection. The specification also provides substantial support for defining private or residential systems through the assignment of unique identities to these systems which are different from the identity of the local system operator.

Because of the inherent advantages associated with IS-136 operation, it is desirable to have IS-136 compliant mobile stations access the system via the DCCH. However, unlike the analog control channel which is defined within a fixed frequency range (21 dedicated RF channels), the DCCH can be assigned to any frequency allocated to the system and, depending on capacity requirements, one or more additional DCCHs may be defined on other RF channels in the system. Hence, a DCCH-capable mobile station cannot simply scan a fixed set of RF channels in order to locate and lock onto a DCCH for the purpose of obtaining service, but must find the DCCH through some other method. One method for locating a DCCH is for the mobile station to scan a list of the most recent valid DCCHs to which the mobile station has successfully locked. Another method, which is specified in IS-136, is for the mobile station to scan a set of "probability blocks" containing lists of RF channels where it is likely to find a DCCH. In certain situations, however, these scanning methods may require a relatively long time to locate an operational DCCH. Hence, an alternative method according to IS-136 is to transmit to the mobile station a DCCH locator message on the analog control channel (or on the DTCH). This message informs the mobile station of where to go in order to find a DCCH (e.g., identifies the RF channel number and slot number for the DCCH).

The foregoing methods for locating a DCCH do not allow for a great degree of flexibility in directing a mobile station to the most appropriate DCCH for purposes of providing service to this mobile station. In particular, none of these methods takes into account the geographic location or service preference of the mobile subscriber. Furthermore, the method of broadcasting a DCCH locator message on the analog control channel has proven to be problematic in practice. At present, the industry is bringing to the market dual-mode mobile stations which are capable of operating in either an analog mode compliant with the older EIA/TIA-553 (AMPS) standard or a digital mode compliant with the newer IS-136 (D-AMPS) standard. However, there are currently over 5 million analog mobile stations in the field which were designed for operation on the analog control channel as originally specified in the AMPS standard. Many of these analog mobile stations are unable to process the DCCH locator message which can be sent on the analog control channel as specified in IS-136. When this message is sent, these mobile stations lose synchronization on the current control channel and, therefore, rescan for a valid control channel. If this message is sent frequently, these mobile stations go into a permanent "No Service" state. Even when this message is sent less frequently, these analog mobile stations are likely to miss incoming calls or fail to originate calls at a failure rate which is higher than normal.

The present invention overcomes the limitations of the prior DCCH locating methods and the problem associated with the processing of the DCCH locator message by existing analog mobile stations. With the present invention, the system is able to dynamically point DCCH-capable mobile stations to a DCCH which best suits the objectives of the user or the system. From a user service perspective, it may be desirable to steer the mobile station to a DCCH in its preferred private system whenever the mobile station is nearby so that the user can take advantage of any services provided exclusively by that private system. From a system capacity standpoint, it may be desirable to direct the mobile station to a DCCH in the smallest cell (e.g., microcell) in the area. Furthermore, from a performance point of view, it may be desirable to serve the mobile station from the cell in the hierarchial cell structure which provides the best radio coverage in his location. These objectives and others can be met by use of the present invention.

SUMMARY OF THE INVENTION

The present invention provides a method for the registration of mobile stations over an analog control channel (ACCH) and for directing dual-mode mobile stations to a digital control channel (DCCH). The method comprises the steps of transmitting over the ACCH from one of the mobile stations to the system a registration access message including an indication of whether the mobile station is an analog-only or a dual-mode mobile station; determining at the system from the indication whether the mobile station is an analog-only or a dual-mode mobile station; if the mobile station is determined to be an analog only mobile station, transmitting over the ACCH from the system to the mobile station, in response to the registration access message, a registration confirmation message indicating that the mobile station has been registered with the system; and if the mobile station is determined to be a dual-mode mobile station, transmitting over the ACCH from the system to the mobile station, in response to the registration access message, a registration confirmation message indicating that the mobile station has been registered with the system and further including an indication of the location of the DCCH. The indicated DCCH can be selected by the system based on the subscriber profile and physical location of the dual-mode mobile station.

In another aspect, the present invention provides a mobile station comprising means for transmitting a registration access message over an analog control channel (ACCH); means for receiving over the ACCH a registration confirmation message including an indication of a digital control channel (DCCH) on which the mobile station can communicate data; means for switching the mobile station to the DCCH; and means for communicating data over the DCCH. The ACCH can be any one of the 21 dedicated control channels in the system or a specific pilot channel to which the mobile station tunes at power up.

In yet another aspect, the present invention provides a method for directing mobile stations from an analog control channel (ACCH) to one of a plurality of digital control channels (DCCHs) in a communications system. The method comprises the steps of broadcasting over the ACCH from the system to the mobile stations a plurality of overhead messages in an overhead message train (OMT); transmitting over the ACCH from one of the mobile stations to the system, in response to the receipt of at least one predetermined overhead message in the OMT, a system access message including an identification of the one mobile station; selecting at the system, in response to the receipt of the system access message, one of the DCCHs based on the subscriber profile and physical location of the mobile station; transmitting over the ACCH from the system to the mobile station a mobile station control message including an identification of the selected DCCH; and switching the mobile station to the selected DCCH. The system access message can be a call origination, a page response or a registration access message.

In a further aspect, the present invention provides a method for managing the allocation of control channels in a communications system employing a plurality of digital control channels (DCCHS) and at least one analog control channel (ACCH). The method comprises the steps of receiving at the system an access message transmitted from a mobile station over the at least one ACCH; determining at the system, in response to the receipt of the access message, whether the mobile station is capable of operating on the DCCHs; if the mobile station is DCCH-capable, transmitting from the system to the mobile station a mobile station control message over the at least one ACCH, the mobile station control message including an identification of a DCCH selected by the system for use by the mobile station; if the mobile station is not DCCH-capable, transmitting from the system to the mobile station an acknowledgment message over the at least one ACCH; receiving the mobile station control message or the acknowledgment message at the mobile station; if the mobile station is DCCH-capable, establishing communication between the mobile station and the system over the selected DCCH; and if the mobile station is not DCCH-capable, continuing communication between the mobile station and the system over the at least one ACCH. The system can determine whether the mobile station is DCCH-capable by determining whether the access message includes a mobile station protocol indicator (MPCI) indicating that the mobile station is DCCH-capable, or whether it includes an electronic serial number (ESN) which is within a range defined for DCCH-capable mobile station. Alternatively, the system may determine whether the mobile station is DCCH-capable by determining whether a subscriber profile stored for the mobile station at the system includes an indication that the mobile station is DCCH-capable.

BRIEF DESCRIPTION OF THE DRAWINGS

The present invention will be better understood and its numerous objects and advantages will become apparent to those skilled in the art by reference to the following drawings in which.

DETAILED DESCRIPTION

Figure 1:
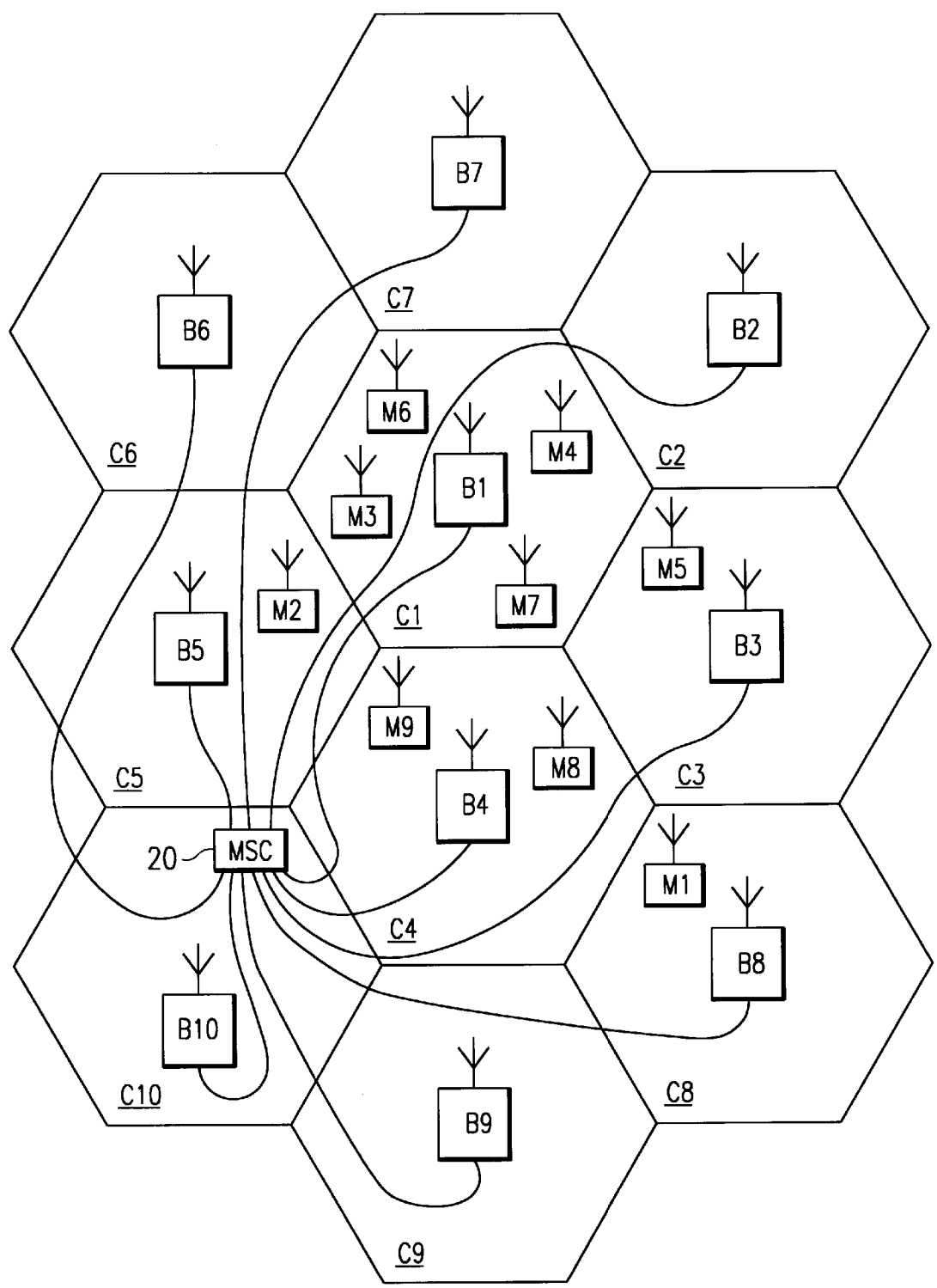
FIG. 1 shows the architecture of a conventional cellular radio system.
Figure 2:
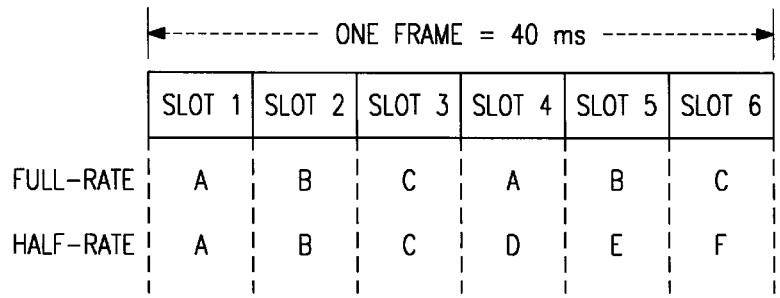
FIG. 2 shows the structure of a time division multiplexed (TDM) radio frequency (RF) channel according to IS-54B, a known industry standard.
Figure 3:
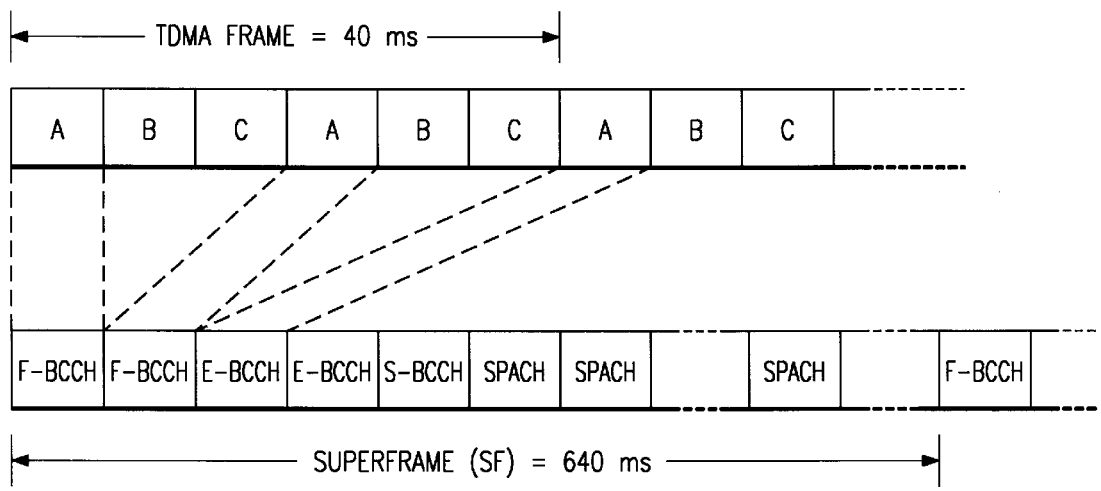
FIG. 3 shows the structure for a superframe of a digital control channel (DCCH) defined over the TDM RF channel shown in FIG. 2, as specified in IS-136, a known industry standard.
Figure 4:
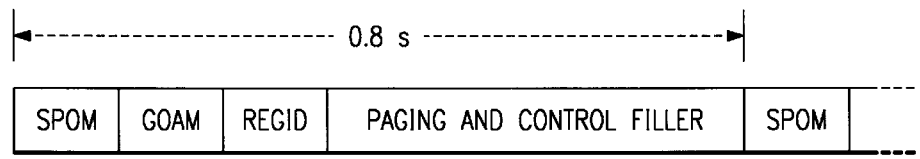
FIG. 4 shows the format of the analog control channel (ACCH) which can be used to direct mobile stations to the DCCH in accordance with the present invention.

The present invention uses the facilities of the existing analog control channel to direct the newer dual-mode mobile stations to a proper DCCH without interfering with the operation of the older analog mobile stations. Referring first to FIG. 4, the analog forward control channel (FOCC) on the downlink from the base station to a mobile station carries a continuous data stream of messages each consisting of one or more words. Two basic types of messages are defined in the EIA/TIA standards: overhead messages which are broadcast for global use by all mobile stations and mobile station control messages which are directed to specific mobile stations. Overhead messages are sent in a group called the overhead message train (OMT) and fall into several functional classes including the system parameter overhead message (SPOM), the global action overhead message (GAOM), the registration identification (REGID) message and the control-filler message.

The first message of each OMT must always be the SPOM which is transmitted every 0.8±0.3 seconds. The SPOM consists of two words which contain information about the serving cellular system. Each of the GOAM and REGID consists of one word which is appended at the end of the SPOM and sent on an as-needed basis. When sent, the REGID message must be appended to the SPOM or, if any global action messages are sent, to the last GOAM in the OMT. Any number of global action messages may be appended to a SPOM as desired. Examples of global action messages include the message to rescan control channels, the registration increment (REGINCR) message and the location area message. The control-filler message consists of one word which is sent to fill gaps between different messages or between word blocks of a multi-word message sent on the FOCC. The mobile station control message consists of from one to five words which are sent on an as-needed basis. Examples of mobile station control messages include paging messages, analog voice channel or digital traffic channel (full-rate or half-rate) assignment messages, and registration confirmation messages.

The DCCH locator message specified for the FOCC in IS-136 is an overhead message called the digital control channel information message (DCCHI) consisting of one word which is appended at the end of the SPOM and sent on as-needed basis with a maximum periodicity of 5 seconds. As an overhead message, the DCCHI is sent on the FOCC for use by the entire population of mobile stations in the coverage area of the base station (i.e., every mobile station listening to this particular FOCC). Consequently, all the analog mobile stations in this population would be exposed to the risk of malfunction as a result of being unable to process the DCCHI while all the dual-mode (DCCH-capable) mobile stations in this population would be directed to the same DCCH as indicated in the DCCHI regardless of their individual characteristics.

According to the present invention, these shortcomings can be overcome by sending the information associated with the DCCH locator message in a mobile station control message instead of an overhead message. This mobile station control message can be sent, for example, in response to a registration message sent by a mobile station. From or in connection with the receipt of the registration message, the system determines the identity of the mobile station (i.e., its MIN), its protocol capability (i.e., whether its DCCH-capable) and its physical location. If the mobile station is DCCH-capable, the system can then send to the mobile station a mobile station control message (e.g., registration confirmation message) containing data which identifies the most suitable DCCH based on the subscriber's service profile and its actual physical location. Thus, for example, the mobile station may be directed to a nearby private system to which the subscriber belongs. On the other hand, if the mobile station is not DCCH-capable (e.g., if it is an analog-only mobile station), the system will send, for example, a normal acknowledgement message (without any DCCH locator information) to this mobile station. In this manner, analog-only mobile stations can be protected from the risk of malfunction due to any inability to process DCCH locator messages.

The present invention will now be illustrated in the context of the mobile registration process which is used for keeping track of the location and activity of mobile stations operating in a cellular system. A mobile station can register either autonomously or non-autonomously. Autonomous registration occurs automatically without user intervention. Non-autonomous registration, on the other hand, is initiated manually by the user (e.g., by pressing a designated button on the mobile station). For convenience, only the autonomous registration process is specifically discussed below. It should be understood, however, that the teachings of the present invention as described in connection with the autonomous registration process apply with equal force to non-autonomous registration.

Current cellular systems (i.e., those compliant with IS-54B or IS-136) support four types of autonomous registration: system area, location area, power up/down and periodic registration (EIA/TIA-553 supported only system area and periodic registration). The system area and location area registration functions cause a mobile station to register when it enters a new system area or a new location area, respectively. These registration functions can be used to identify the current location of the mobile station for purposes of efficiently routing an incoming call (i.e., paging in its current or most likely location rather than in all locations). The power up/down and periodic registration functions cause the mobile station to register at power up/down or at predetermined time intervals defined by the system operator, respectively. These registration functions may be used to determine whether a mobile station is active (powered and within radio range) in a cellular system. Incoming calls to inactive mobile stations can be routed immediately to a recorded message (e.g., "The mobile customer you have called has turned off the mobile unit or travelled out of the service area.") without ever paging these mobile stations. This reduces the paging load and results in more efficient use of the limited control channel capacity.

Figure 5:
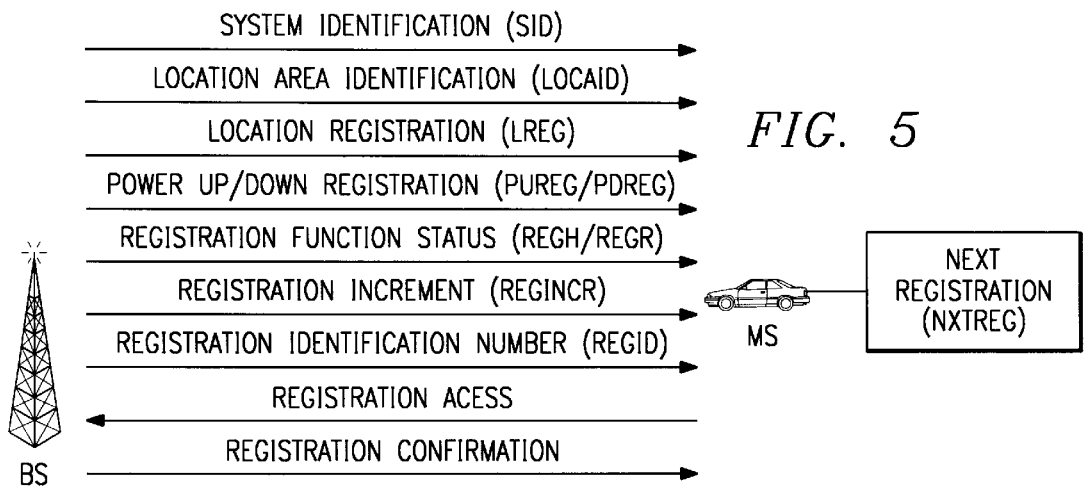
FIG. 5 shows the registration parameters which are sent by a base station (BS) over the ACCH and stored in a mobile station (MS)

Referring next to FIG. 5, the parameters that regulate the various mobile registration functions include the system identification (SID), the location area identification (LOCAID), the location registration (LREG) status bit, the power up/down registration (PUREG and PDREG) status bits, the periodic registration (REGH and REGR) status bits, the registration identification (REGID) value, the registration increment (REGINCR) value, and the next registration (NXTREG) value. These parameters (except for NXTREG) are transmitted in the overhead message train (OMT) on the forward control channel (FOCC) from the base station (BS) to the mobile station (MS) as generally shown in FIGS. 4–5. More specifically, the SID, REGH and REGR are sent in the SPOM. The LOCAID, LREG, PUREG and PDREG are sent in a GOAM known as the location area global action message. The REGINCR value is sent in the registration increment (RGINCR) global action message. The REGID value is sent in the registration identification (REGID) overhead message.

The SID is a digital number which uniquely identifies the serving cellular system. The LOCAID is a digital number which identifies a particular location area comprised of one or more cells in the system. The LREG status bit indicates whether location area registration is enabled or disabled in this location area (1=enabled and 0=disabled). The PUREG and PDREG status bits indicate whether power up and power down registration, respectively, are enabled or disabled in this location area. The REGH and REGR status bits indicate whether periodic registration is enabled or disabled for the home stations and roaming stations, respectively. The REGINCR defines the length of the periodic registration interval (how often to register). The REGID is a 20-bit counter that is stepped by one unit in every REGID message transmitted to the mobile station. The NXTREG value indicates when periodic registration is due and is calculated internally in the mobile station by adding the current values of REGID and REGINCR.

At power up, the mobile station tunes to the strongest dedicated forward control channel (FOCC), or to the FOCC which satisfies certain predetermined criteria, to receive the OMT and then sets the SID value in its (temporary or semi-permanent) memory to the SID value in the SPOM. The mobile station also sets PUREG, PDREG and NXTREG to zero and REGINCR to its default value of 450. Thereafter, the mobile station will register and update its memory with new values for the relevant registration parameters (as discussed more fully below). When registering, the mobile station transmits a registration access message on the reverse control channel (RECC). Upon receipt of the registration message, the system marks the mobile station as active and registers it to be in the system and/or location area containing the cell of the base station which received the registration message. The system will then transmit a registration confirmation message on the FOCC back to the mobile station.

Figure 6:
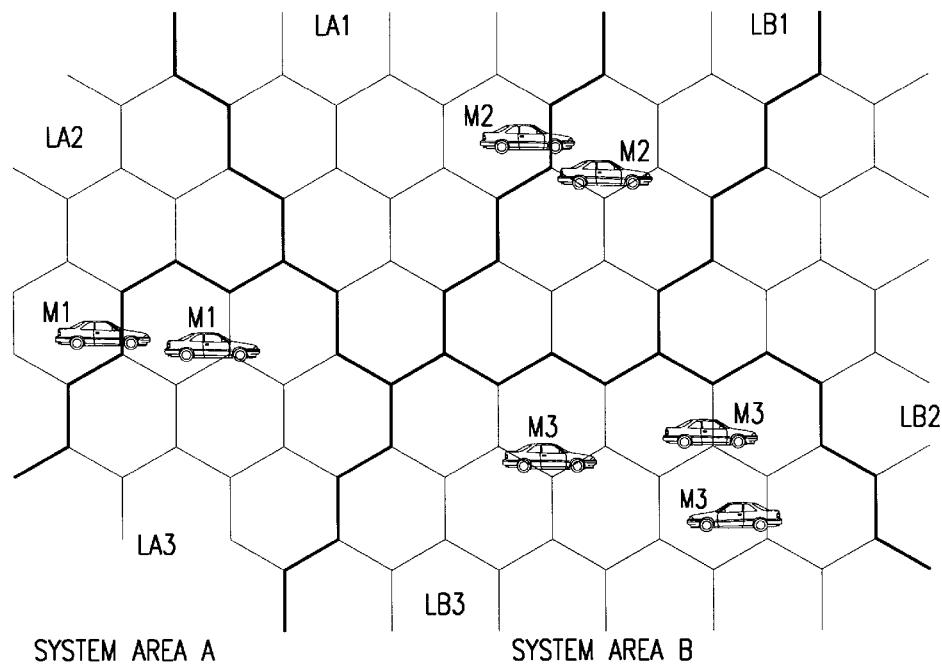
FIG. 6 is a schematic illustrating the various mobile registration functions controlled by the parameters of FIG. 5.

Referring next to FIG. 6, a pictorial illustration of the various mobile registration functions may now be seen. FIG. 6 shows exemplary portions of two adjacent cellular system areas A and B in which mobile stations M1–M3 can travel. System area A is divided into a plurality of location areas including location areas LA1–LA3. Similarly, system area B is divided into a plurality of location areas including LB1–LB3. The forward control channel (FOCC) in each of the cells in system area A carries the system identification (SID) for system A (SID-A). Similarly, the FOCC in each of the cells in system area B carries the II SID for system B (SID-B). In addition, the FOCC in each of the cells in LA1–LA3 carries the location area identification (LOCAID) for LA1–LA3, respectively. Similarly, the FOCC in each of the cells in LB1–LB3 carries the LOCAID for LB1–LB3, respectively.

Upon receiving an OMT over the FOCC, each of the mobile stations M1–M3 in FIG. 6 compares the SID value and (if a location area global action message was received with LREG=1) the LOCAID value received over the FOCC with the corresponding values of these parameters which were stored in its (semi-permanent) memory the last time it received a registration confirmation message. If the received SID or LOCAID value is different from the corresponding stored value (because the mobile station has travelled to a new system or location area), the mobile station will send a registration message to the system. In the example shown in FIG. 5, M1 registers upon crossing the border between LA2 and LA3 (i.e., location area registration) and updates its stored LOCAID value after receipt of the registration confirmation message. M2 registers upon crossing the border between LA1 in system area A and LB1 in system area B (i.e., system area registration) and updates both its stored SID and LOCAID values after receipt of the registration confirmation message. M3, however, is staying within LB3 and is not crossing any system or location area borders. Nevertheless, M3 may register at power up/down or periodically within this location area as further described below.

Assume that power up and power down registration are enabled in LB3 (i.e., PUREG=1 and PDREG=1) and that M3 had been turned off after moving into and registering in LB3 (i.e., location area registration). At that time M3 had stored in its memory the values of PUREG and PDREG (contained in the location area global action message). When M3 is turned back on it checks the SID received in the OMT (as described before). In this case, the stored SID will match the received SID and, therefore, M3 next checks the stored value of PUREG. Since power up registration is enabled, M3 will send a registration access message over the reverse control channel. Similarly, if M3 is turned off while in LB3 (with SID being the same), it will check the stored value of PDREG. Since power down registration is also enabled in LB3, M3 will register with the system as it is being turned off.

Assume now that M3 is turned on and moving around in LB3. Upon receipt of each REGID message and assuming that the periodic registration function is activated for this class of mobile stations (as indicated by REGH or REGR) within this location area (LB3), the mobile station (M3) first checks whether the REGID value has cycled through zero. If NXTREG is greater than or equal to (REGID+REGINCR+5), then NXTREG is set to the greater of zero or (NXTREG$-2^{20}$). The mobile station then compares the last received REGIED value with the stored value for NXTREG. If REGID is greater than or equal to the stored NXTREG, the mobile station sends a registration access to the system. If the system confirms the registration, the mobile station updates NXTREG with the value of the last received REGID plus REGINCR. If the registration access attempt fails, however, the mobile will attempt to re-register after a random delay by setting the NXTREG value to the value of REGID plus a random number (NRANDOM).

At call origination or reception, the mobile station updates NXTREG (with the sum of the current REGID and REGINCR values) after every successful voice or traffic channel designation (since by making or receiving a call a mobile station shows its activity and location, call originations and receptions are treated like normal periodic registrations). The mobile station can access the system to make a call at any time by transmitting an originating call access request. The call access request is received by the base station serving the cell in which the mobile station is then located. The system will then register the mobile station in the relevant location area and transmit an initial voice channel designation message (IVCD) for an analog voice channel, or an initial digital traffic channel message (IDTC) for a digital voice channel, to assign the mobile station to an available voice channel. Similarly, when the system receives an incoming call for a mobile station, the system will send a paging message over the control channels of the location area in which the mobile is currently registered. The mobile station will respond by transmitting a page response message back to the system. Upon receipt of the page response message, the system will assign an available voice channel to the mobile station by transmitting an IVCD or IDTC message. Upon receipt of the IVCD or IDTC, the mobile station will update its NXTREG and thereafter will register at the time indicated by this value.

In IS-54B the foregoing mobile registration functions are specified in a hierarchy which prevents the mobile station from performing duplicative registrations. For example, when a mobile station performs a power up registration it may be considered to be effectively performing a location area registration or a periodic registration (since PUREG and SID are the only parameters which control power up registration). Similarly, when a mobile station travels from one location area to another and performs a location area registration it may be considered to be effectively performing a periodic registration (since LOCAID and LREG are the only parameters which control location area registration). Thus, according to IS-54B, the registration functions are organized at the following levels (in descending order):

1. System area registration (new SID).
2. Power up registration (same SID and PUREG=1).
3. Location area registration (new LOCAID).
4. Implied registration (call origination or reception).
5. Periodic registration (REGID $\geq$ NXTREG).

In this hierarchy, registration at a higher level implies a registration at a lower level. IS-54B uses a number of Boolean variables in order to prevent the mobile station from performing a lower level registration after having performed a higher level registration. These variables control the registration parameters update in, and subsequent registration activities of, a mobile station and include the first idle ID status, the first location area ID status, the first registration ID status, and the location registration ID status. The first idle ID status indicates that the registration parameters have been updated in the mobile station since entering the idle state. The first location area ID status indicates that a new LOCAID has been received by the mobile station (thus triggering a location area registration). The first registration ID status indicates that the mobile station has performed a location area registration in this location area. Finally, the location registration ID status indicates that the mobile station has performed a power up registration prior to receiving a location area global action message (thus it can update the registration parameters without having to transmit a location area registration message).

During the registration process (whether system area, location area, power up, or periodic registration) the mobile station sends to the system a registration access message on the reverse control channel (RECC). If the system properly receives and processes the registration access message, it will send to the mobile station a registration confirmation message on the forward control channel (FOCC) to indicate that the registration access was successful and the mobile station is now registered with the system according to its current location. The mobile station, in turn, can then update its registration parameters as appropriate. In conventional systems, therefore, the registration confirmation message is used to indicate registration success without more. According to the present invention, however, the registration confirmation message can be used for the additional purpose of directing dual-mode (analog-digital) mobile stations to the most suitable digital control channel (DCCH). Analog-only mobile stations, on the other hand, can continue to receive conventional registration confirmation messages.

Figure 7:
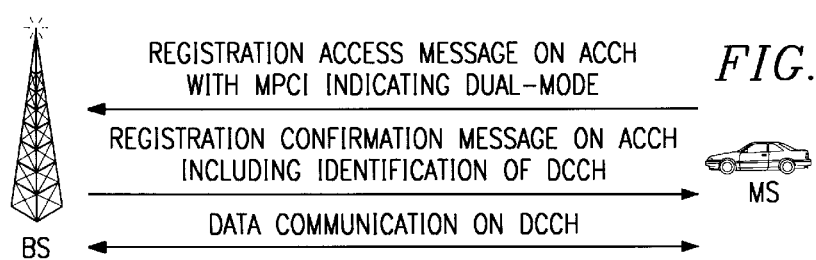
FIG. 7 shows a mobile station being directed from an ACCH to a DCCH through the process of mobile registration in accordance with the present invention.

The system can readily distinguish between dual-mode and analog-only mobile stations from the mobile protocol capability indicator (MPCI) and/or the electronic serial number (ESN) which is included in the registration access message. The MPCI indicates, for example, whether the mobile station is an analog mobile station compliant with the EIA/TIA-553 standard or a DCCH-capable mobile station compliant with the EIA/TIA IS-136 standard. The system may also identify the mobile station as DCCH-capable if its ESN falls within a predefined range. Alternatively, the system may check the subscriber profile for the mobile station to determine whether it contains an indication that the mobile station is DCCH-capable (information regarding the characteristics of an IS-54B or IS-136 mobile station may be sent from the mobile station to the system in a terminal information message over the DTCH and stored by the system in the corresponding subscriber profile). If the mobile station is determined to be DCCH-capable (from the MPCI, ESN, subscriber profile or otherwise), the registration confirmation message will contain an indication of an available DCCH which can best serve the needs of the mobile station, as generally shown in FIG. 7. Upon receiving the registration confirmation message, the mobile station can switch to and exchange data over this DCCH.

In determining the best DCCH for a particular mobile station, the system can examine the subscriber profile for and the current physical location of the mobile station. The system can then select an available DCCH in the geographic area of the mobile station which can support all (or the maximum number) of features and services indicated in the subscriber profile while providing the best possible link quality for the connection with the mobile station. For example, if the subscriber profile indicates that the mobile station belongs to a private system located in the current geographic area of the mobile station, the system can identify an available DCCH in the private system and then direct the mobile station to this DCCH by including identifying data (e.g., channel number, slot number, etc.) for this DCCH in the registration confirmation message (or other mobile station control message) sent to the mobile station. Similarly, if the subscriber profile indicates that the user of the mobile station subscribes to certain data services (e.g., SMS) which are available on some DCCHs but not other DCCHs in current location area of the mobile station, the system can direct the mobile station to the nearest DCCH which can support the desired data services.

The present invention, therefore, allows for great flexibility in optimizing the operation of dual-mode mobile stations on the DCCH. Unlike prior techniques for DCCH assignment, the system of the present invention can take into account the individual characteristics of a particular mobile station and assign that mobile station to the DCCH in its current location which is best able to support those characteristics. For this reason it may be desirable to default dual-mode mobile stations to analog operation at power up. In this manner, a dual-mode mobile station will quickly tune to an analog control channel (as it only needs to scan 21 dedicated channels) rather than having to "hunt" for a digital control channel within some arbitrary range. Once on the analog control channel the mobile station will send a power up registration access message (or, alternatively, some other system access message announcing its presence to the system). In response, the system will send a registration confirmation message (or some other mobile station control message such as a voicemail message waiting order) which identifies the most appropriate DCCH for the mobile station given its subscriber profile and physical location.

Defaulting dual-mode mobile stations to an analog control channel at power up has two primary benefits. First, it allows the mobile station to obtain service from the system as quickly as possible. This may be critical if, for example, the user desires to make an emergency (911) call. Second, it allows the system to direct the mobile station to a specific DCCH based on the specific circumstances of the mobile station. Because of these benefits it may be desirable in some applications to provide a "pilot" (designated) analog control channel to which the dual-mode mobile stations can immediately tune at power up (instead of scanning the usual set of 21 dedicated channels). In other applications a digital pilot channel may be used with the mobile stations being directed to the appropriate DCCH through messages transmitted over the pilot channel.

In general, those skilled in the art will readily recognize that many modifications and variations may be made to the embodiments of the present invention disclosed herein without substantially departing from the spirit and scope of the present invention. Accordingly, the form of the invention disclosed herein is exemplary and is not intended as a limitation on the scope of the invention as defined in the following claims.

I claim:

1. A method for directing mobile stations from an analog control channel (ACCH) to one of a plurality of digital control channels (DCCHs) in a communications system comprising the steps of:

broadcasting over said ACCH from said system to said mobile stations a plurality of overhead messages in an overhead message train (OMT) comprising a system parameter overhead message (SPOM), a global action overhead message (GAOM) and a registration identification (REGID) message;

transmitting over said ACCH from one of said mobile stations to said system, in response to the receipt of at least one predetermined overhead message in the OMT, a registration access message including an identification of said one mobile station;

selecting at said system, in response to the receipt of said registration access message, one of said DCCHs based on the subscriber profile and physical location of said one mobile station;

transmitting over said ACCH from said system to said one mobile station a mobile station control message including an identification of said selected DCCH; and switching said one mobile station to said selected DCCH.

2. The method of claim 1 wherein said mobile station stores a system identification (SID) value and said at least one predetermined overhead message comprises a SPOM containing a SID value which is different from said stored SID value.

3. The method of claim 1 wherein said mobile station stores a system identification (SID) value and said at least one predetermined overhead message comprises:

a SPOM containing a SID value which is the same as said stored SID value; and a GOAM containing a power up registration indication.

4. The method of claim 1 wherein said mobile station stores a location area identification (LOCAID) value and said at least one predetermined overhead message comprises a GOAM containing a LOCAID value which is different from said stored LOCAID value.

5. The method of claim 1 wherein said mobile station stores a next registration (NXTREG) value and said at least one predetermined overhead message comprises a REGID message containing a REGID value which is greater or equal to said stored NXTREG value.

6. A method for managing the allocation of control channels in a communications system employing a plurality of digital control channels (DCCHs) and at least one analog control channel (ACCH), the method comprising the steps of:

receiving at said system an access message transmitted from a mobile station over said at least one ACCH;

determining at said system, in response to the receipt of said access message, whether a subscriber profile stored for said mobile station at said system includes an indication that said mobile station is capable of operating on said DCCHs;

if said mobile station is DCCH-capable, transmitting from said system to said mobile station a mobile station control message over said at least one ACCH, said mobile station control message including an identification of a DCCH selected by said system for use by said mobile station;

if said mobile station is not DCCH-capable, transmitting from said system to said mobile station an acknowledgment message over said at least one ACCH;

receiving said mobile station control message or said acknowledgment message at said mobile station;

if said mobile station is DCCH-capable, establishing communication between said mobile station and said system over said selected DCCH; and if said mobile station is not DCCH-capable, continuing communication between said mobile station and said system over said at least one ACCH.

7. The method of claim 6 wherein said access message is registration message and said mobile station control message or said acknowledgment message is a registration confirmation message.

8. The method of claim 6 wherein said selected DCCH is an available DCCH in the current area of said mobile station.

9. The method of claim 6 wherein said selected DCCH is an available DCCH on which said mobile station can receive services to which it subscribes as indicated by said subscriber profile.

* * * * *